United States Patent
Lustenberger

(10) Patent No.: US 8,507,810 B2
(45) Date of Patent: Aug. 13, 2013

(54) DYNAMIC SCALE UTILIZING SHEAR MEASUREMENTS TO DETERMINE A WEIGHT OF BULK MATERIAL

(75) Inventor: Martin Lustenberger, Villars Sur Glane (CH)

(73) Assignee: Digi Sens AG, Murten (CH)

( * ) Notice: Subject to any disclaimer, the term of this patent is extended or adjusted under 35 U.S.C. 154(b) by 289 days.

(21) Appl. No.: 12/596,949

(22) PCT Filed: Apr. 25, 2008

(86) PCT No.: PCT/CH2008/000190
§ 371 (c)(1),
(2), (4) Date: Dec. 22, 2009

(87) PCT Pub. No.: WO2008/131574
PCT Pub. Date: Nov. 6, 2008

(65) Prior Publication Data
US 2010/0126781 A1    May 27, 2010

(30) Foreign Application Priority Data
Apr. 26, 2007    (CH) .................................... 686/07

(51) Int. Cl.
*G01G 19/08*    (2006.01)
*G01G 19/12*    (2006.01)

(52) U.S. Cl.
USPC .......................................... 177/136; 177/139

(58) Field of Classification Search
USPC .......................................... 177/136–141, 211
See application file for complete search history.

(56) References Cited

U.S. PATENT DOCUMENTS

| | | | | |
|---|---|---|---|---|
| 3,620,074 A | * | 11/1971 | Laimins et al. | 73/862.631 |
| 3,734,216 A | * | 5/1973 | Nordstrom et al. | 177/136 |
| 3,878,908 A | * | 4/1975 | Andersson et al. | 177/136 |

(Continued)

FOREIGN PATENT DOCUMENTS

| | | |
|---|---|---|
| DE | 4439342 A1 | 5/1996 |
| EP | 0638787 A1 | 2/1995 |
| EP | 1147383 A1 | 10/2001 |
| WO | WO-9740352 A1 | 10/1997 |

OTHER PUBLICATIONS

Ganci, Paolo, "International Search Report" for PCT/CH2008/000190 as mailed Jul. 23, 2008 (4 Pages).

*Primary Examiner* — Randy W Gibson
(74) *Attorney, Agent, or Firm* — Winstead PC

(57) ABSTRACT

The invention relates to a dynamic scale for bulk material, having two swivel arms (2) and two load-lifting arms (8) mounted to the free end of said swivel arms, with one hole (7) being located in each of the swivel arms (2) and positioned transversely to the extension of the swivel arm and also transversely to the neutral fiber brought about by the flexural load. A pipe (9) is fitted into the hole (7) and is welded thereto. The pipe (9) comprises two sensors (14, 15) transversely to the longitudinal axis thereof, said sensors being located at an angle of substantially 90° to each other and each being disposed at an angle of ±45° to the direction of the shear stress component $\tau_{xy}$. Under the influence of the shear stress, the cross section of the tube (9) is deformed into an ellipse that is inclined at about 45°, the shorter and longer axis (11, 13) thereof being measured using the sensors (14, 15). Said sensors (14, 15) each comprise two force inlets (16, 17), which are inserted with pretension in suitable recesses in the tube (9).

9 Claims, 2 Drawing Sheets

(56) References Cited

U.S. PATENT DOCUMENTS

Figure 1:
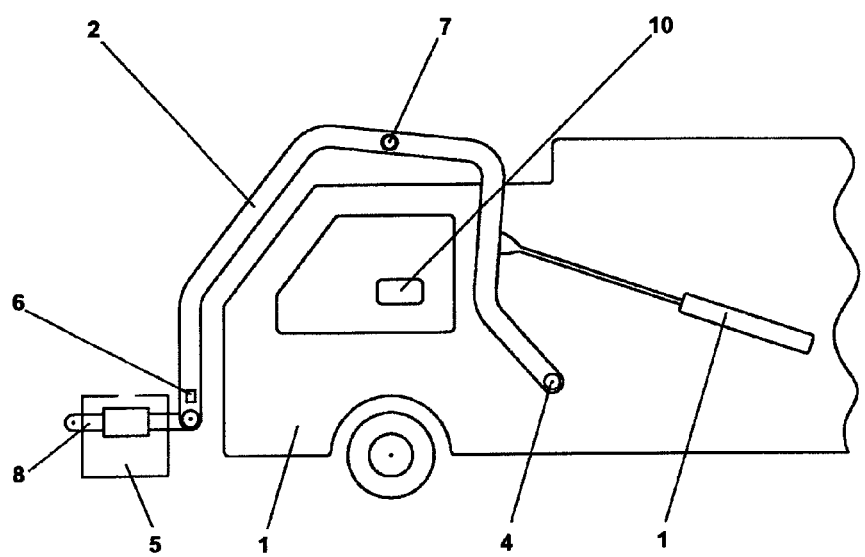

| | | | |
|---|---|---|---|
| 4,421,186 A * | 12/1983 | Bradley | 177/139 |
| 4,641,719 A * | 2/1987 | Harbour | 177/136 |
| 5,119,894 A * | 6/1992 | Crawford et al. | 177/145 |
| 5,230,393 A * | 7/1993 | Mezey | 177/139 |
| 5,245,137 A * | 9/1993 | Bowman et al. | 177/139 |
| 5,811,738 A * | 9/1998 | Boyovich et al. | 177/136 |
| 5,837,945 A * | 11/1998 | Cornwell et al. | 177/136 |
| 6,118,083 A * | 9/2000 | Boyovich et al. | 177/136 |
| 6,627,825 B1 * | 9/2003 | Creswick | 177/141 |
| 6,769,315 B2 * | 8/2004 | Stevenson et al. | 73/862.629 |
| 7,795,547 B2 * | 9/2010 | Hansen | 177/1 |
| 2008/0073129 A1 * | 3/2008 | Heuer | 177/136 |
| 2008/0314649 A1 * | 12/2008 | Hansen | 177/139 |

* cited by examiner

DYNAMIC SCALE UTILIZING SHEAR MEASUREMENTS TO DETERMINE A WEIGHT OF BULK MATERIAL

The present invention relates to a dynamic scale for bulk material, in particular for refuse collection vehicles, according to the preamble of claim 1. The term dynamic scale describes the fact that the weighing process is completed during the lifting of the container when full and lowering it when empty, more generally during the traversal of a suitably defined weighing window.

Dynamic scales, including those for refuse collection vehicles, are known, for example from WO 97/40352 (D1). A further publication from the same class of invention exists in EP 0 638 787 (D2). In both publications, so-called bulk material scales are disclosed, in which the deflection of the lifting arms of the device for lifting and weighing the refuse is measured by means of suitable sensors. In D1, one extension measurement strip (EMS) is provided per arm of the lifting device for measuring the bending moment, and in D2 there are two of these. This has the advantage that the fundamentally uncertain position of the centre of gravity can be eliminated by arithmetic means. The mounting of an acceleration sensor in the vicinity of the working load is also known from D2. The determination of weight or mass via the measurement of bending moments is generally preferred, because the cost of integration is also relatively low. The measuring of bending moments is based mainly on the idea either of measuring a local elongation on the outside and/or a local shortening on the inside of a deflected rod. The disadvantage of this measurement method however lies in the strong dependence of the measured bending moment on the location of the load impact. The measurement method proposed in D2 is certainly elegant, but leads to increased integration costs relative to that of D1; furthermore, an essential disadvantage of the measurement of moments by means of EMS remains: the EMS that are usually used for this are mounted externally on the hollow profiles used for the lifting arms. Hence they are severely exposed to the rough operation of household refuse collection.

The problem addressed by the present invention is to create a device which does not measure the bending moments in order to determine the load and which can be furthermore extended in such a way that the actual measurement device is protected against the conditions in which it is operated in an optimal manner. The solution to the problem addressed is reproduced in the characterising part of claim 1 with respect to its essential features, and in the following claims with respect to further advantageous designs.

In the refuse collection and weighing device according to the invention the mass of a refuse container can be defined in terms of the shear stress in the swivel arms, once in the full state and, after emptying, in the empty state. In order to carry out this determination of mass also while the whole lifting device is moving, an acceleration sensor is mounted on the lifting device at a suitable place. This allows any possible inclination of the rubbish collecting vehicle and the local acceleration of the refuse container to both be determined, and this both during the raising of the full refuse container, and during the lowering of the empty one. An actual dynamic weighing process is thus enabled, which eliminates the need to stop the lifting device and weighing device both during the raising and the lowering of the refuse container.

On the basis of the accompanying drawings, the subject matter of the invention is clarified in more detail.

They show:
FIG. 1 a side view of the device,
FIG. 2 an enlarged side view of an extract of FIG. 1
FIG. 3 an enlarged view of an extract of FIG. 2

FIG. 1 is a side view of a refuse collecting vehicle 1 with one of in this case two interconnected swivel arms 2, and one (also of two) hydraulic cylinders 3. The swivel arms 2 are swivel-mounted on the refuse collecting vehicle 1 at a suitable place in swivel joints 4 and with load-holding arms 8 arranged at their free ends for holding a refuse container 5, or also two of these, as is known. The swivel arms 2 carry, also at their free ends, an acceleration sensor 6—or in case they are movable independently of one another, one each. A computer 10 for analysis of the measurement results described below, and those of the acceleration sensors 6, for recording of customer data and fro logging all readings is preferably installed in the driver's cab of the refuse collection vehicle 1. The swivel arms 2 each have a hole 7 (see also Fig.), into which preferably a pipe 9 with circular cross-section is, for example, welded flush. The longitudinal axis the pipe 9 passes perpendicular to the neutral fibre 12 of each swivel arm 2. Under loading of the swivel arms 2 by a full or empty refuse container 5 and also by the inherent weight of the lifting device consisting of the elements 2, 3 and 8, a shear stress—as well as the bending strain—also acts on the swivel arm 2, which deforms the hole 7 and the pipe fitted therein into an ellipse, the minor axis of which bears the number 11, the major axis the number 13, in the same orientation of FIG. 2 and FIG. 1.

Figure 2:
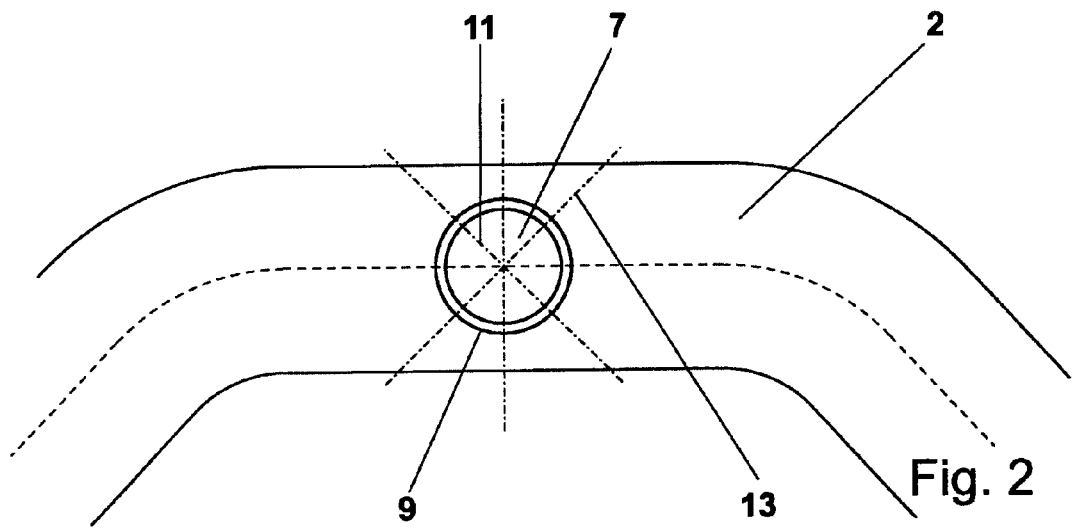
Figure 3:
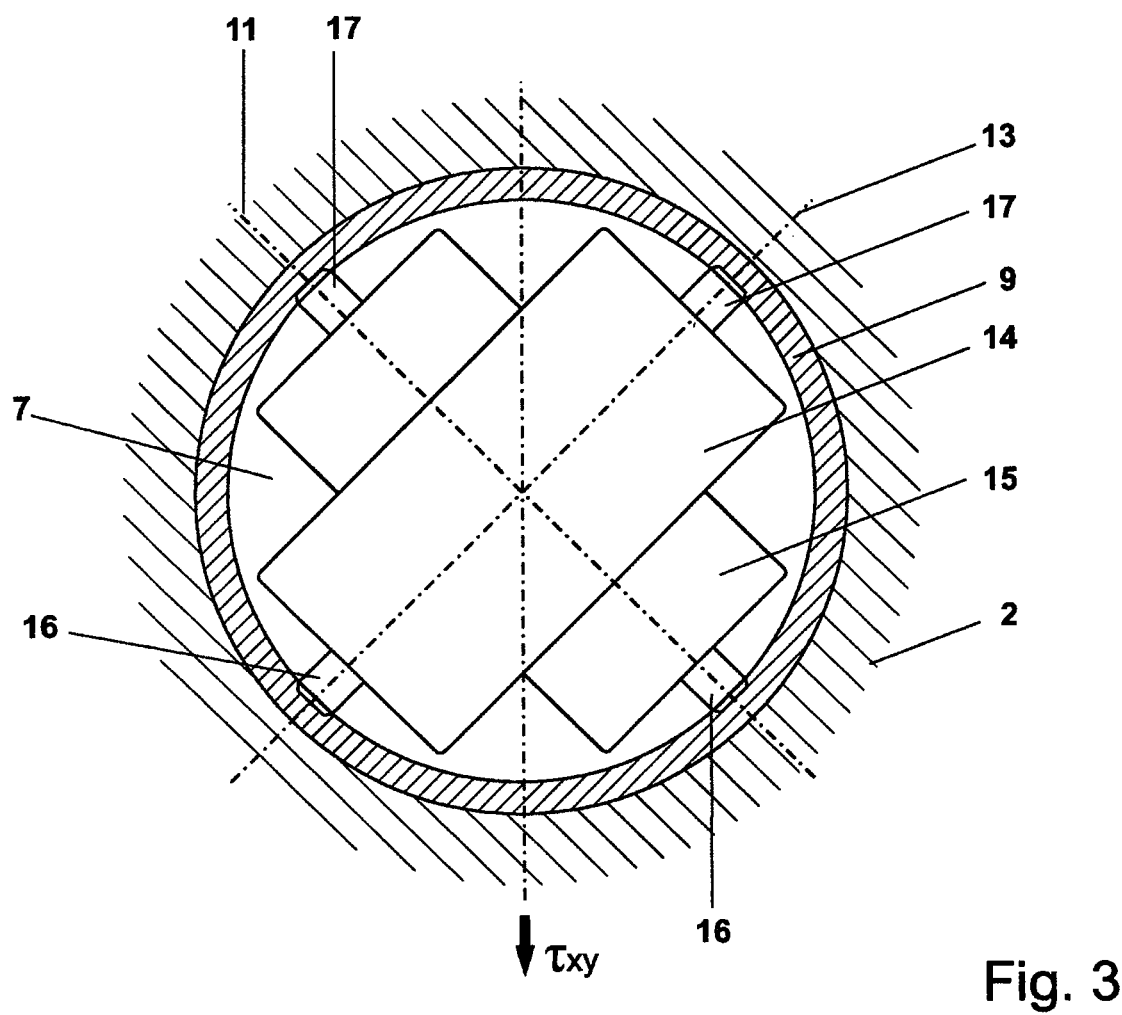

FIG. 3, again oriented in the same way as FIG. 1 and FIG. 2, shows two sensors 14, 15, which are fitted into the hole 7; the first sensor 14 toward the longer axis of 13 the ellipse that is expected to be formed, the second sensor 15 toward the shorter axis 11. Both sensors 14, 15 are offset one behind the other in the direction of the axis of the pipe 9, at an angle of essentially 90° to each other. Furthermore they are each turned at an angle of essentially ±45° to each of the tensor components $\tau_{xy}$ of the shear stress $\tau$. Each of the two sensors 14, 15 has two force inputs 16, 17 which are each inserted for example into a suitably applied recess in the wall of the pipe 9 under pre-tension. A further possibility for the mounting of the sensors 14, 15 consists in bolting each of the force inputs 16 to 17 on to two brackets welded into the pipe 9. The internal construction of the sensors 14, 15, known per se, causes the tension of a vibrating string in each of the sensors 14, 15 to change, when the path-dependent force on the two force inputs 16, 17 changes. This means that the contraction of the one diameter of the pipe 9 and the expansion of the other are measured simultaneously and correlated with each other by the computer 10. The simultaneous measurement at the same place has the advantage that the temperatures of both sensors 14, 15 are also the same, so that the measurement results are essentially independent of the temperature course of the sensors.

To protect against environmental interference, such as dust, humidity and mechanical effects, the pipe 9 can be closed off on both sides that such effects can be eliminated.

Obviously, the device consisting of the swivel arms 2, load holding arms 8 and the sensors 14, 15, can be mounted both on the side of as well as at the rear of the refuse collecting vehicle. This is true in the case of suitable shaping of the swivel arms 2.

The swivel arms 2 can be both rigidly connected together or individually movable. If they should in the latter case work in unison, this unison—in a manner known per se—can be brought about by coordinated actuation of the hydraulic cylinders or by visual coordination of the swivel arms. The weighing process now takes place when the swivel arms 2 are raised. During lifting, they traverse a so-called weighing window. The weighing window is normally determined on the basis of the specific type of a refuse collection vehicle. Its lower edge can for example be defined by the impact-free travel of the hydraulic components, its upper by the independent opening of the lid of the refuse container. The weighing window therefore comprises the dynamically smooth phase of the lifting process and lowering process. The presence of the acceleration sensor 6 therefore permits on the one hand the limiting of the weighing window, on the other hand it allows acceleration forces to be measured, which influence the mass to be weighed (gross and tare).

If the weighing window is dynamically established once, it can also be defined preferably by contactless switches, which are initialised by the traversal of for example the lifting arm or arms (2).

The computer 10 permits the mass values that are sought to be kept mathematically separate from the additional acceleration forces and so the true mass value of the loaded refuse to be determined and recorded.

After reaching the target position above the refuse opening (not shown) of the refuse collecting vehicle 1 the refuse container is emptied and the swivel arms are moved back, again through the weighing window. The net weight of the refuse is now determined in the computer 10 in a known manner, as net=gross−tare.

The invention claimed is:

1. A dynamic scale for bulk material comprising:
   two swivel arms;
   a sensor disposed with each swivel arm of the two swivel arms to measure a shear stress in each swivel arm of the two swivel arms, the sensor comprising:
   a hole being oriented generally transverse to a neutral fiber of a bending strain of a swivel arm of the two swivel arms;
   at least one sensing element disposed in the hole and oriented generally transverse to a longitudinal axis of the hole, the at least one sensing element being able to measure changes in a diameter of the hole resulting from shear stress; and
   wherein the at least one sensing element is inserted and at angle of approximately ±45° to a direction of a shear stress $\tau_{xy}$ of the swivel arm of the two swivel arms; and
   an acceleration sensor disposed with at least one swivel arm of the two swivel arms to correct a determination of a mass by a current acceleration value.

2. The dynamic scale for bulk material according to claim 1, wherein:
   two sensing elements are disposed in the hole and are arranged at an angle of approximately 90° relative to each other;
   a first sensing element of the two sensing elements measures enlargement of the diameter of the hole; and
   a second sensing element of the two sensing elements measures contraction of the diameter of the hole.

3. The dynamic scale for bulk material according to claim 1, wherein:
   the at least one sensing element comprises two force inputs; and
   each force input of the two force inputs is received, under pre-tension, into a recess in the hole.

4. The dynamic scale for bulk material according to claim 1, wherein:
   the at least one sensing element comprises two force inputs; and
   each force input of the two force inputs is secured by a screw connection to a bracket that is secured within the hole.

5. The dynamic scale for bulk material according to claim 1, wherein:
   a weighing window is defined by measurements of the acceleration sensor; and
   the measurements of the acceleration sensor do not exceed a given limit.

6. The dynamic scale for bulk material according to claim 1, wherein a weighing window is defined by a traversal of the swivel arms past at least one contactless switch.

7. The dynamic scale for bulk material according to claim 5, wherein a gross weight is measured during raising of the two swivel arms, and a tare weight is measured during lowering of the two swivel arms.

8. The dynamic scale for bulk material according to claim 5, wherein determination of a load of a refuse container is made during traversal of the weighing window.

9. The dynamic scale for bulk material according to claim 1, wherein the two swivel arms are constructed as at least one of a front-loading device, a side-loading device, and a rear-loading device.

* * * * *

UNITED STATES PATENT AND TRADEMARK OFFICE
CERTIFICATE OF CORRECTION

PATENT NO.        : 8,507,810 B2                                               Page 1 of 1
APPLICATION NO. : 12/596949
DATED             : August 13, 2013
INVENTOR(S)       : Martin Lustenberger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this

Fifteenth Day of September, 2015

Michelle K. Lee
*Director of the United States Patent and Trademark Office*